United States Patent
Shirai et al.

[15] 3,676,365
[45] July 11, 1972

[54] METHOD FOR MANUFACTURING ACTIVATED CARBON AND APPARATUS THEREFOR

[72] Inventors: Yoshihiro Shirai, Osaka; Hirohiko Ichikawa, Kyoto; Akira Yoshida, Nishinomiya; Naotake Uchida, Osaka; Masaru Tsuji, Takarazuka; Zenji Matsumoto, Osaka, all of Japan

[73] Assignee: Takeda Chemical Industries, Ltd., Higashi-ku, Osaka, Japan

[22] Filed: March 2, 1970

[21] Appl. No.: 15,743

Related U.S. Application Data

[63] Continuation-in-part of Ser. No. 599,175, Dec. 5, 1966, abandoned.

[30] Foreign Application Priority Data

Dec. 6, 1965 Japan..................................40/75158
Dec. 7, 1965 Japan..................................40/75424

[52] U.S. Cl.............................252/422, 23/209.4, 23/284, 201/20, 201/25, 201/29, 201/31, 201/33, 201/43, 201/44, 202/121, 202/265, 252/421, 252/423, 252/445

[51] Int. Cl. .......................................................C01b 31/08

[58] Field of Search ...............................252/421–425, 445; 23/259.5, 259.7, 279, 314; 201/5, 12, 22, 28, 31–34; 202/121, 221, 265

[56] References Cited

UNITED STATES PATENTS

| | | | |
|---|---|---|---|
| 2,536,782 | 1/1951 | Stuart | 252/421 |
| 1,634,478 | 7/1927 | Wickenden et al. | 252/421 |
| 3,454,382 | 7/1969 | Hamilton | 201/34 |
| 2,536,105 | 1/1951 | Stuart | 252/421 |
| 1,334,404 | 3/1920 | Rodman | 201/12 |
| 1,334,405 | 3/1920 | Rodman | 201/12 |
| 2,750,330 | 6/1956 | Nelson | 201/28 |
| 2,508,474 | 5/1950 | Slyh et al. | 252/422 |

FOREIGN PATENTS OR APPLICATIONS

| | | | |
|---|---|---|---|
| 198,328 | 4/1924 | Great Britain | 252/421 |

*Primary Examiner*—Daniel E. Wyman
*Assistant Examiner*—P. E. Konopka
*Attorney*—Clario Ceccon

[57] ABSTRACT

In preparing activated carbon by carbonizing and then activating cellulosic material impregnated with activating agent, the process of the invention is characterized by continuously supplying said activating agent-impregnated material into a carbonizing zone containing previously carbonized cellulosic material at such a constant flow rate as to allow the impregnated material to reside in the carbonizing zone at least for 15 minutes and carbonizing the impregnated material in said carbonizing zone with the carbonized cellulosic material which is heated at 150° to 350° C. by counter currently supplied hot gases and which forms an agitated fluidized bed by being fluidized with the hot gas stream and being stirred by a mechanical means.

6 Claims, 6 Drawing Figures

PATENTED JUL 11 1972 3,676,365
SHEET 2 OF 3

METHOD FOR MANUFACTURING ACTIVATED CARBON AND APPARATUS THEREFOR

This application is a continuation-in-part of our copending application, Ser. No. 599,175, filed Dec. 5, 1966, now abandoned.

This invention relates to the manufacture of activated carbon and the apparatus therefor. More particularly, the invention pertains to the method and apparatus for the continuous production of homogeneously activated carbon from the activating agent-impregnated cellulosic material.

The method for the manufacture of activated carbon consisting of carbonizing under heat the cellulosic material impregnated with an activating agent, such as zinc chloride, and the activating the resultant product is well known in the art. According to the known methods, however, it is unavoidable that the cellulosic material being carbonized becomes slimy or mushy due to the dehydration effect of the activating agent to cling to the inner walls of the apparatus and to aggregate into coarse lumps of more than 2 cm in diameter, making it difficult to obtain homogeneously activated carbon of good quality. In addition, the volume efficiency of the apparatus, such as rotary kiln, is very poor, the value ($v/V$, wherein V is the interior volume of the kiln and $v$ is the volume of the content under treatment, being usually 15 percent or thereabout. The greater part of the hot gases being supplied is accordingly wasted without intimate contact with the material being treated, and the gas must be supplied at a temperature considerably higher than the temperature needed for activation, often higher than the boiling point of the activating agent. The rise in the temperature of the gases being supplied, however, accompanies an increase in the vaporization of the activating agent, and the poor volume efficiency of the furnace allows most of the vaporized portion of the activating agent to evacuate the kiln in accompaniment with the exhaust gases. To recover the dispelled agent, further, there should be set up a larger scale recovering apparatus, inviting the hazard of public nuisance due to the poisonous contents of the gases when the recovering is incomplete.

Carbonization and activation may be carried out batch by batch in a single furnace. In this case, however, continuous operation cannot be practised and there can hardly be obtained activated carbon of uniform quality as in the case with the rotary kiln. As heat, further, must be applied externally, the thermal efficiency becomes extremely poor and the material constituting the apparatus is considerably corroded. This process is accordingly not suitable for large scale production.

One object of this invention is accordingly to provide a new and useful method for the manufacture of activated carbon and the apparatus therefor by overcoming the aforesaid shortcomings of the conventional method.

Another object of the invention is to provide the method and apparatus for carbonizing the activating agent-impregnated material without causing the material to cling to the wall of the furnace or to aggregate into detrimental coarse lumps.

Another object of the invention is to provide the method and apparatus for the manufacture of homogeneously activated carbon from the aforesaid carbonized product.

A further object of the invention is to provide the method and apparatus for the production of the aforesaid activated carbon, wherein the waste of the activating agent is prohibited to the greatest possible extent, so that the apparatus for recovering the spent activating agent is not necessary or minimized to the smallest possible extent.

A still further object of the invention is to provide the method and apparatus for the manufacture of activated carbon having in addition to the aforesaid characteristics the carbonizing zone and the activating zone combined into a single unit, so that the structure as a whole is greatly minimized and the continuous performance of carbonization and activation is carried out with a high order of efficiency.

These and other objects and the specific features of this invention will be made clear in the light of the following.

The method of the present invention for the continuous manufacture of activated carbon comprises the sequential continuous steps of:

a. impregnating a comminuted cellulosic material with an activating agent;

b. continuously supplying said activating agent-impregnated material into a carbonizing zone containing previously carbonized cellulosic material at such a constant flow rate as to allow the impregnated material to reside in the carbonizing zone at least for 15 minutes;

c. carbonizing the impregnated material in said carbonizing zone with the carbonized cellulosic material which is heated at 150° to 350° C by counter-currently supplied hot gases and which forms an agitated fluidized bed by being fluidized with the hot gas stream and being stirred by a mechanical means;

d. evacuating the resultant carbonized material from the carbonizing zone into an activating zone at a correspondingly constant flow rate;

e. activating with hot gases in said activating zone said carbonized material at temperatures of at least 400° C;

f. recycling at least part of said gases from said activating zone to said carbonizing zone; and g. withdrawing the activated material from said activating zone at a constant rate so as to maintain the operation continuous.

It is necessary in the carbonizing step of the present process that the activating agent-impregnated cellulosic material be supplied continuously at a constant flow rate and be carbonized with previously carbonized material which is heated by countercurrently supplied hot gas at 150° to 350° C and which forms an agitated fluidized bed by being fluidized with the hot gas stream and being stirred by a mechanical stirring means. That is to say, the carbonized material present in the carbonizing zone is fluidized and stirred by the countercurrent flow of hot gas and by a mechanical stirring means, thereby to form an agitated fluidized bed, and the impregnated cellulosic material, continuously fed, is brought into contact with and mixed with the hot carbonized material which is fluidized and agitated, whereby the impregnated material is rapidly carbonized to produce homogeneously carbonized grains of about 0.5 to 5 mm in diameter, which do not cling to the walls of apparatus and do not aggregate into detrimental coarse lumps. The resultant carbonized product serves in turn as a fresh medium for the carbonization of the impregnated cellulosic material subsequently fed. The residence time of at least 15 minutes ensures the effective contact of the impregnated cellulosic material with the carbonized material already in the carbonizing zone. The supply rate per minute of the impregnated cellulosic material, in terms of the com-bined dry weight of the cellulosic material and activating agent, may be preferably in the range of (1/15) to (1/60) the weight of the carbonized material present in the carbonizing zone, whereby the impregnated material supplied is always brought into contact with and mixed with a large amount of the hot carbonized material with the result that the carbonization of the impregnated material can be more effectively conducted completely free from the clinging to the wall of the apparatus and the aggregation into coarse lumps. Most preferably the impregnated material is supplied in dry weight to the carbonizing zone at a rate per minute of (1/20) to (1/40) the weight of the carbonized material.

Consequently, it is quite essential for producing homogeneously carbonized material from activating agent-impregnated cellulosic material in accordance with the invention that:

1. the impregnated cellulosic material be continuously fed at such a constant flow rate as to allow the impregnated material to reside in the carbonizing zone at least for 15 minutes, and 2. said carbonized material be fluidized and stirred by the countercurrently supplied hot gases and by a mechanical stirring means to form an agitated fluidized bed.

When any of the above essential factors (1) and (2) should be omitted, there cannot be obtained a highly homogeneous carbonized material with the results that clinging to the walls of the apparatus and aggregating into detrimental coarse lumps become unavoidable.

Another feature of this invention is that the carbonizing zone and the activating zone can be combined into a continuously associated single unit. Consequently, the apparatus as a whole is greatly minimized in dimension; the carbonizing operation and the activating operation are carried out in a continuous manner; and the exhaust gases evacuating the activating zone can be directly used for carbonization in the carbonizing zone, whereby enabling the effective use of heat and a considerable gain in the efficiency of the apparatus as a whole. There is accordingly no need of supplying excessively hot gases, so that the activating gases can be supplied at a lower temperature than that of the conventional method, and the vaporization of the activating agent can be confined to a minimum. The carbonizing zone being operated at a temperature lower than that being applied to the activating zone, the vaporized portion of the activating agents can be automatically recovered by condensation in the carbonizing zone for further activation in the activating zone. Thus, the evacuation of the spent activating agent is markedly prohibited, making the apparatus for recovering the spent activating agent from the exhaust gases almost unnecessary or extremely minimized.

In this invention may be employed any cellulosic material which is comminuted to suitable size, but sawdust is most desirable. It is usually predried to a moisture content of less than 30 percent by weight, preferably not more than 20 percent by weight. The activating agent employed in this invention includes zinc chloride, phosphoric acid and the like known agents, of which zinc chloride is most suitable. Such agent is ordinarily impregnated in the cellulosic material in an amount selected out of a wide range in accordance with the requirements of the desired activated product, usually 1.5 to 3.5 times the weight of the dried cellulosic material.

For a fuller understanding of this invention, there are described hereinafter the preferred embodiments of the same, with reference to the accompanying drawings in which.

Figure 1:
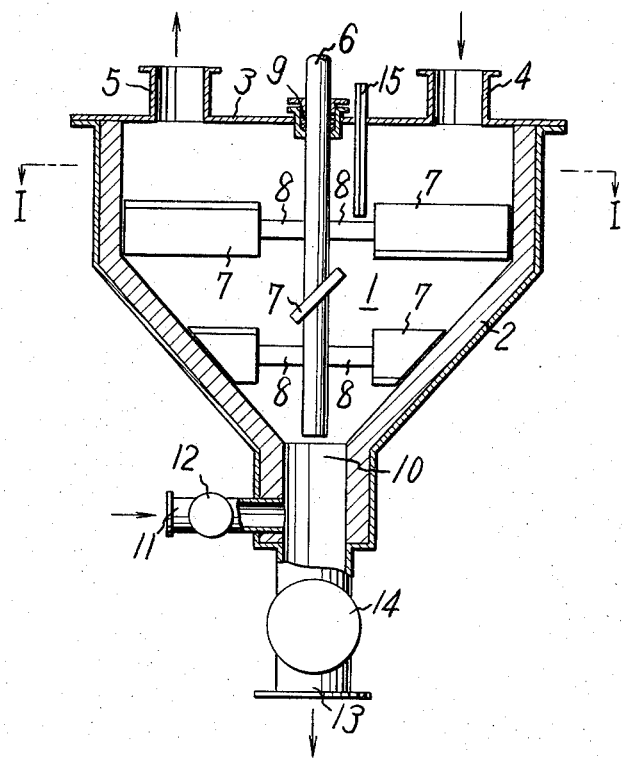
FIG. 1 is a vertical sectional view of a preferred embodiment of the carbonizing apparatus of this invention.
Figure 2:
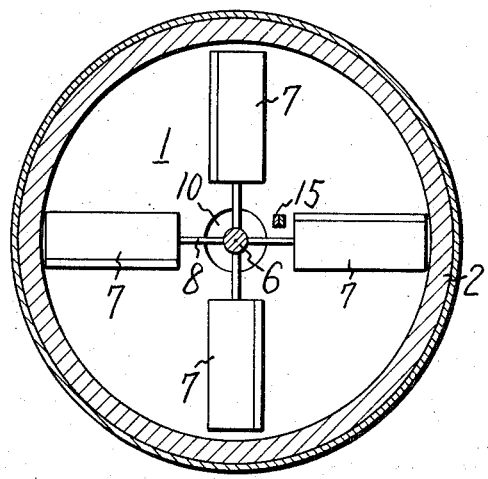
FIG. 2 is a cross sectional view along the line I — I of FIG. 1.

Referring now to the carbonizing apparatus shown in FIGS. 1 and 2, the carbonizing zone 1 which is a furnace made of steel or other suitable metal is lined with fire-proof material 2, such as fire bricks, in the present embodiment. The present furnace is funnel-shaped, but the shape of the furnace is not necessarily confined to the shown. Passing through the lid 3 which is secured to the top of the furnace 1 are integrally provided a cellulosic material inlet 4 and an exhaust gas outlet 5, both having one end of the passage opening into the furnace 1 and the other end respectively associated with the wood material supply mechanism and the gas outlet mechanism, such as a fan, not shown. Along the axial line of said furnace 1 is operationally provided a rotary shaft 6 having a plurality of radially extending stirrers 7 secured in position by means of fixing rods 8. The stirrers 7 serve to form an agitated fluidized bed of the carbonized material in cooperation with counter currently supplied hot gases. In the present embodiment, each of said stirrers 7 is provided so as to have the working surface tilted upwardly at an angle of 45° in association with the direction of the rotary movement to be applied, so that the stirrers 7 act not only horizontally but also vertically on the cellulosic material travelling downward. As the cellulosic material being treated in the furnace 1 is fluidized by the action of the hot gases passing therethrough upwardly, said stirrers 7 may not necessarily be provided at said inclined angle. Their number, position, direction and inclination can therefore be selected suitably. To prevent effectively the cellulosic material being carbonized from clinging to the wall of the furnace 1, stirrers 7, however, are so designed as to have their terminal ends as close as possible to the wall of the furnace 1. There may also be used ribbon-type stirrers to facilitate the vertical agitation of the cellulosic material being treated in the furnace 1. The rotary shaft 6 passing through the lid 3 has the upper end associated with a suitable driving mechanism not shown and is held in position via gasket 9. Passing through the wall of the elongated mouth 10 of the funnel shaped furnace 1, there is integrally provided a hot gas inlet 11 having a control valve 12 installed along its passage. To the terminal end of the elongated mouth 10 is integrally secured the carbonized product outlet 13 having a control valve 14 installed along its passage. The thermostat 15 which is suitably installed in the furnace 1 is so adapted as to maintain the inner temperature of the furnace 1 at a predetermined level by controlling via electrical mechanism not shown the supply of the hot gases passing through the inlet 11.

At the initial stage of carbonization, the control valve 14 is closed and the furnace 1 is charged with carbonized material externally prepared. Then the stirrers 7 are set on motion via rotary shaft 6 while the hot gases are simultaneously supplied via inlet 11 to fluidize the carbonized material. Thus the agitated fluidized bed of the carbonized material is formed. When the charged carbonized material is heated by said gases to a temperature between 150° to 350° C., preferably between 200° to 300° C., the activating agent-impregnated cellulosic material is supplied via inlet 4 and the control valve 14 is opened to allow the carbonized product to evacuate the furnace 1. In this case, the flow rate of the cellulosic material being supplied and that of the carbonized product evacuating the furnace 1 of its own weight should be so regulated that there is neither oversupply of the cellulosic material nor overevacuation of the carbonized product. Said rate is to be further so regulated as to allow the cellulosic material being carbonized to reside in the furnace 1 at least for 15 minutes. Preferable supply rate per minute of the impregnated material in dry weight may be in the range of (1/15) to (1/60) the weight of the carbonized material in the carbonizing zone. Once the suitable flow level is found, however, there is no need of further regulation and the carbonization is carried out in a continuous manner quite satisfactorily. The height of the content in the furnace 1 can also be maintained at a constant level.

The activating agent-impregnated cellulosic material being supplied is carbonized almost instantaneously when it comes to be mixed with the carbonized media which is present in the furnace 1 in great quantities and which is forming an agitated fluidized bed at a predetermined temperature. Consequently, the cellulosic material being carbonized is allowed to keep itself in a constantly dry state and prevented from clinging to the wall of the furnace 1 or aggregating into detrimental coarse lumps. By allowing the cellulosic material being carbonized to reside in the furnace 1 for 15 minutes or more, the inner temperature of the furnace 1 can be easily maintained at a constant level, and the resultant carbonized product serves as a fresh medium for facilitating the carbonization of the cellulosic material being supplied at a constant flow rate. The carbonized product then evacuates the furnace 1 via outlet 13 in a constant flow amount corresponding to that of the cellulosic material being supplied via inlet 4. The control of the inner temperature of the furnace 1 can be performed quite easily if the cellulosic material being carbonized is allowed to reside in the furnace 1 as long as possible. From the industrial point of view, however, the residence time should preferably not exceed 180 minutes, the desirable range being from 30 to 120 minutes and the lowest limit being 15 minutes or thereabout.

Any oxygen-containing gases, such as air, may be employed as the carbonizing gas in this invention. To avoid the burning of the cellulosic material being carbonized, however, gases like nitrogen or the like inert gases containing no oxygen is preferable. The furnace 1 being charged with the material externally carbonized and being carbonized therein and of a high order of volume efficiency, the carbonizing gas may be supplied at a normal carbonizing temperature. In practice, however, the temperature is determined with reference to the residence time of the cellulosic material being carbonized and other factors like the shape and quality of the cellulosic material being supplied. Oxygen-containing gases like air should be carefully employed to avoid the burning of the cellulosic material under carbonization. Gases containing no oxygen may be employed at a relatively high temperature insofar as the inner temperature of the furnace 1 is maintained at between 150° to 350° C. The flow amount of hot gases is controlled by handling the control valve 12 or automatically through the thermostat 15 mechanism so as to keep the carbonizing temperature at a constant level.

Figure 3:
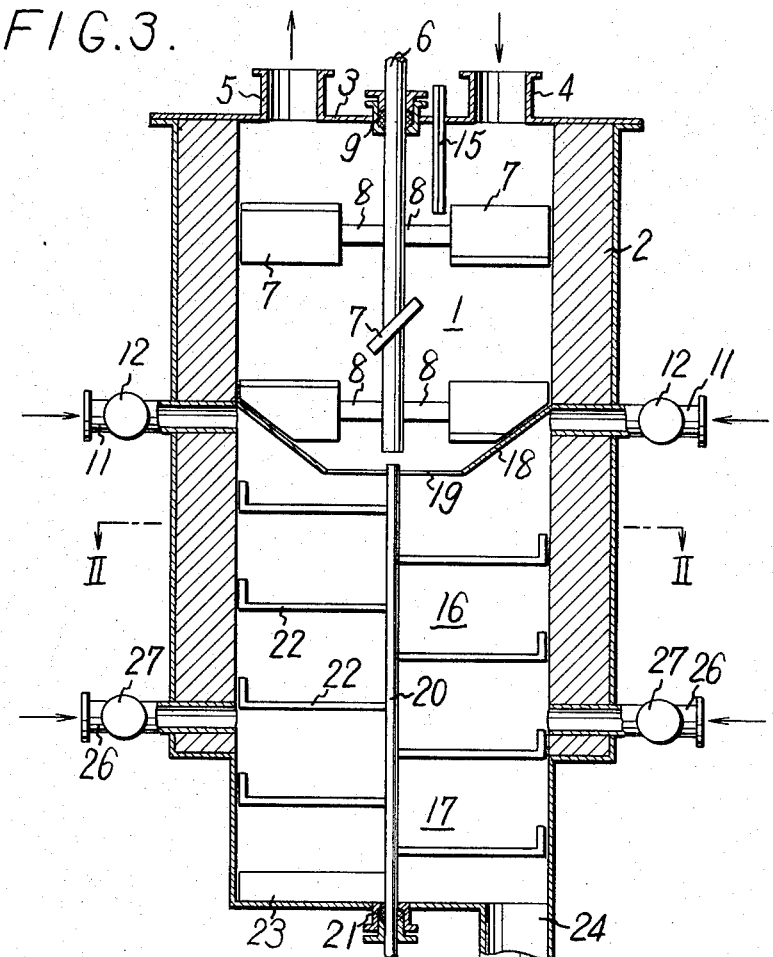
FIG. 3 is a vertical sectional view of one of the preferred embodiments of the combined carbonizing the activating unit of this invention.
Figure 4:
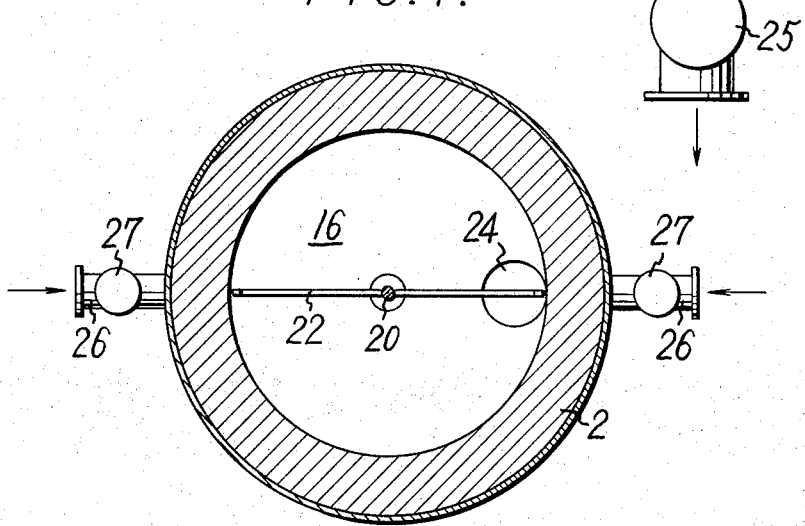
FIG. 4 is a cross sectional view along the line II — II of FIG. 3.

Referring next to FIGS. 3 and 4 wherein the same numerical figures refer to the same members having the same function as in FIGS. 1 and 2, the carbonizing zone 1 which is a cylindrical furnace in the present embodiment is integrally associated to the activating zone 16 which is also a cylindrical furnace of the same size and diameter. The wall of these furnaces 1 and 16 is lined with fire-proof bricks 2 as in FIGS. 1 and 2, excepting the lower integral portion 17 of the activating furnace 16. This portion 17 is adapted for cooling the activated product while passing therethrough. To facilitate the uniform stirring of the material being carbonized in the carbonizing zone 1, there is operationally secured to the bottom end of the carbonizing furnace 1 a disc-shaped funnel-like member 18 having an opening 19 for passing the carbonized product. This member 18 further serves as a means to uniformly lead the carbonizing gases and the spent activating gas into the carbonizing zone 1. Of these gases, the spent activating gas will be described hereinafter, while the carbonizing gas is supplied via two inlets 11 of the same construction as employed in FIGS. 1 and 2 and each of which is installed in either terminal portion of the wall of the carbonizing furnace 1 and so positioned as to have its passage opening to the bottom side of the disc-like funnel-shaped member 18.

Along the axial line of the carbonizing furnace 1 is operationally positioned a rotary shaft 6 which is held in position via gasket 9, both being of the same construction as in FIGS. 1 and 2, and the upper end of which is operationally associated with a suitable driving mechanism not shown. To this shaft 6 are radially secured stirrers 7 of the same construction and for the same functional purposes as described in connection with FIGS. 1 and 2.

Along the axial line of the activating furnace 16, further, there is operationally provided another rotary shaft 20 having the lower end extruding through the bottom wall of the activating furnace 16, held in position via gasket 21 and associated with a suitable rotary mechanism not shown. To this shaft 20 are radially secured a plurality of rod-shaped stirrers 22, each having the terminal end upwardly projected and facing as close as possible the wall of the activating furnace 16, so as to prevent the downward travelling carbonized product from clinging to the wall of the activating furnace 16 while being activated. To this shaft 20 and in operational contact with the bottom of the cooling zone 17, there is further radially secured a guide plate 23 to facilitate removal of the activated product via the outlet 24 which is integrally passing through the bottom of the cooling zone 17 and has a control valve 25 provided in its passage. The activating gas is led into the activating zone 16 via two inlets 26, each of which is installed in either terminal portion of the wall of the activating furnace 16 and has a control valve 27 provided in its passage.

Figure 5:
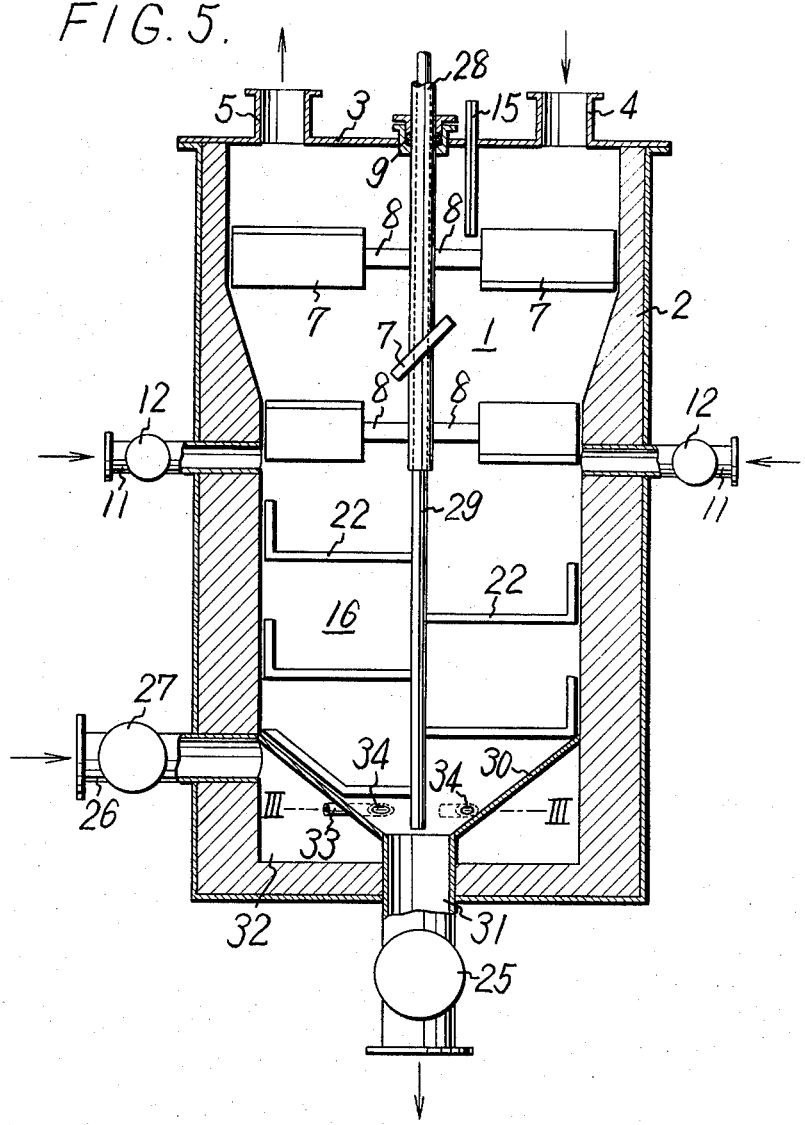
FIG. 5 is a vertical sectional view of another preferred embodiment of the combined carbonizing and activating unit of the this invention.
Figure 6:
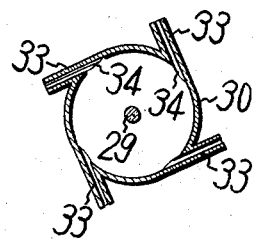
FIG. 6 is a cross sectional view along the line III — III of FIG. 5.

Referring then to FIGS. 5 and 6 wherein the same numerical figures refer to the same members having the same function as in FIGS. 1 to 5, the carbonizing zone 1 and the activating zone 16 are integrally combined as in FIGS. 3 and 4 into a single unit having two hot gas inlets 11 suitably installed inbetween. In the present embodiment, however, the carbonizing zone 1 is substantially larger in internal diameter than the activating zone 16, so that the lower portion of the wall of the carbonizing zone 1 is downwardly tapered so as to form an opening operationally associated with the activating furnace 16 which is entirely protected with fire-proof bricks 2 as in the case with the carbonizing zone 1.

In addition, the rotary shaft 28 adapted for driving the stirrers 7 is made hollow so as to pass therethrough another rotary shaft 29 adapted for driving the stirring rods 22, both shafts 28 and 29 having the upper end operationally associated with suitable driving mechanisms not shown. The activating zone 16, further, is furnished toward the bottom area with a disc-like funnel-shaped guide member 30 having the elongated mouth 31 extruding through the bottom of the activating furnace 16 and a control valve 25 installed in its passage. The activating gas inlet 26 is installed in the lower portion of the wall of the activating furnace 16 in such a manner that its passage opens into the chamber 32 formed by the funnel-shaped guide member 30 in associated with the bottom wall of the activating furnace 16. The funnel-shaped guide member 30 is further provided with a plurality of pipes 33 having one end 34 opening into the activating zone 16 tangentically relative to the activating furnace 16.

In the apparatus shown in FIGS. 3 to 6, the activating agent-impregnated cellulosic material being supplied via inlet 4 is carbonized while mixing with the carbonized material fluidized and stirred by counter-currently supplied hot gas and stirrers 7 at a predetermined temperature as described in conjunction with the embodiment shown in FIGS. 1 and 2. The resultant carbonized product is then allowed to travel gradually downward of its own weight into the activating zone 16 and finally to evacuate also of its own weight the entire system via outlet 24 or 31. During this course of travelling through the activating zone 16, the carbonized product is fully activated by means of the activating gas being supplied countercurrently via inlet 26. The activating temperature applied is usually 400° C. or thereabout. Because of the improved efficiency of the system as a whole, the activating gas is supplied at a temperature substantially equal to or slightly higher than the activating temperature being applied. There is no need of supplying the activating gas heated to a temperature higher than the boiling point of the activating agent being employed. When zinc chloride is employed as the activating agent, for instance, a temperature between 400° to 700° C. or thereabout is profitably applied to the activating gas. The temperature applied to activating gas being thus substantially lower than the boiling point of the activating agent being used, the vaporization of said activating agent is greatly prohibited. During the course of its upward travel, further, the activating gas being vaporized acts countercurrently upon the carbonized product travelling downward of its own weight, and passes into the carbonizing zone 1 in conjunction with carbonizing gas being supplied via inlet 11, so that the spent activating gas can be utilized as an additional means for the carbonization of the cellulosic material under constant supply. The vaporized portion of the activating agent travelling upward, furthermore, condenses in the carbonizing zone 1, the carbonizing zone 1 being kept at a temperature substantially lower than in the activating zone 16, and the portion thus condensed travels downward in conjunction with the downward travelling carbonized product so as to further function as an activating agent in the activating zone 16, so that the amount of the activating agent evacuating the system via outlet 6 becomes so negligible and the apparatus for recovering said agent is made almost unnecessary or minimized to the smallest possible extent.

The activated product travels downward of its own weight and finally evacuates the system at a constant flow rate corresponding to that being applied to the cellulosic material under constant supply. The product thus obtained is then removed of the remaining activating agent with water and dried according to the con-ventional methods, yielding activated carbon grains having substantially the same size as the intermediate carbonized product. The resultant product may be further pulverized into finer particles according to the ways of employment.

Thus the combined carbonizing-activating system of this invention enables not only to perform carbonization and activation in a continuous manner, but to minimize the apparatus as a whole to a relatively small size, to utilize the heat being applied most effectively, and to confine the waste of the activating agent to the smallest possible extent.

For a further understanding of the principles of this invention, there are disclosed hereinunder the preferred examples, in which all parts and percentages are by weight.

EXAMPLE 1

With 4 parts of an aqueous solution of 60 percent zinc chloride containing hydrochloric acid in a slight amount was impregnated 1 part of sawdust having a moisture content of 20 percent.

In the carbonizing furnace 1 shown in FIGS. 1 and 2, on the other hand, were placed 800 liters of carbonized material externally prepared. The charged material was then uniformly stirred at 25 r.p.m. while hot gases of 500° C. were being passed therethrough via inlet 11 at a flow rate of 1,500 $NM^3$/hr, whereby the agitated fluidized bed of the carbonized material was formed. When the inner temperature of the furnace 1 reached about 300° C., the above activating agent-impregnated sawdust was introduced into the furnace 1 via inlet 4 at a flow rate of 750 kg/hr. The exhaust gases evacuated the furnace 1 via outlet 5 at a flow rate of 50 cm/sec. at 250° C. The activating agent-impregnated sawdust being supplied continuously mixed into the carbonized material previously charged and being produced in the furnace 1, and the carbonization was carried out quite rapidly and continuously in the furnace 1 which was kept at 270° C., without causing the the wood material being carbonized to cling to the wall of the furnace 1 or to aggregate into detrimental lumps. The resultant product evacuated the furnace 1 via outlet 13 at a constant flow rate of 450 kg/hr., yielding desired carbonized product in a state of grains of 5.0 to 1.5 mm in diameter by about 70 percent and those to 1.5 to 0.5 mm in diameter by about 30 percent, totalling in weight ⅔ times the original weight of the wood material supplied.

EXAMPLE 2

With 4 parts of an aqueous solution of 60 percent zinc chloride containing hydrochloric acid in a slight amount was impregnated 1 part of sawdust having moisture content of 20 percent.

In the carbonizing zone 1 and the activating zone 16 of the combined carbonizing-activating unit as shown either in FIGS. 3 and 4 or FIGS. 5 and 6, on the other hand, were placed 1.3 $M^3$ of carbonized material externally prepared. There were then passed carbonizing bases of 500° C. via inlet 11 at a flow rate of 1,250 $NM^3$/hr. and activating gases of 680° C. via inlet 26 at a flow rate of 250 $NM^3$/hr., while the carbonizing zone 1 was stirred at 25 r.p.m. and the activating zone at 3 r.p.m. Thus, the agitated fluidized bed was formed in the carbonized zone. Through the system thus prepared was passed via inlet 4 the above activating agent-impregnated sawdust at a flow rate of 750 kg/hr., allowing the activated product to evacuate the system at a flow rate of 420 kg/hr., the inner temperature of the carbonizing zone 1 being kept at about 250° C. and that of the activating zone 16 at about 550° C. There took place no clinging or aggregating of the sawdust being carbonized, and the product evacuated the system quite continuously. The resultant activated carbon was then leached with water to remove the remaining activating agent and dried, yielding activated carbon in a state of grains of 2.5 to 5.0 mm in diameter by about 30 percent and those of less than 2.5 mm in diameter by about 70 percent.

The activated carbon thus obtained was then subjected to the color removal test which was carried out in accordance with the Japanese Industrial Standard K-1426. More specifically, to 0.1 gr. of dried powder of activated carbon placed in flask were added 40 milliliters of caramel liquor. After stirring for 15 minutes at room temperature, the mixture was filtered and the filtrate was poured 45 mm deep into the color comparison tube of the Duboscq colorimeter. For comparison, the activating agent-impregnated sawdust prepared in the same manner as described above was introduced into the conventional rotary kiln and subjected to countercurrent contact with hot gases of 1,000° C. for 60 minutes. The resultant product obtained in a state of grains from fine to coarse, of which the largest was about 10 cm in diameter, was then pulverized and subjected to the color removal test as specified above. Percent color removal found was as follows:

| | |
|---|---|
| Activated carbon of this invention: | 97 – 99 |
| Activated carbon conventionally prepared: | 70 – 95 |

Having described hereinbefore the preferred embodiments of the principles of this invention, it is apparent to those who are skilled in the art that there may be made various changes and modifications in the same without departing from the principles of the same. It is accordingly requested that the invention be understood rather broadly within the scope and spirit of the appended claims.

What we claim is:

1. A method for the continuous manufacture of activated carbon in a single unit, wherein the product travels downward by gravity through separate carbonizing and activating zones, which comprises the combination of the sequential continuous steps of:
   a. impregnating a comminuted cellulosic material with an activating agent;
   b. continuously supplying said activating agent-impregnated material into a carbonizing fluidized bed zone containing previously carbonized cellulosic material at such a constant flow rate as to allow the impregnated material to reside in the carbonizing zone at least for 15 minutes;
   c. carbonizing the impregnated material in said carbonizing zone with the carbonized cellulosic material maintained at 150° to 350°C and fluidized by countercurrently supplied hot gases while being stirred by a mechanical means;
   d. removing the resultant carbonized material from the carbonizing zone into an activating zone at a constant flow rate corresponding to the rate of supply to the carbonizing zone;
   e. activating with hot countercurrently flowing gases in said activating zone said carbonized material at temperatures of at least 400°C while agitating with a mechanical means;
   f. recycling at least part of said gases from said activating zone to said carbonizing zone; and
   g. withdrawing the activated material from said activating zone at a constant rate so as to maintain the levels of material in the carbonizing zone and in the activating zone substantially constant.

2. The method for the continuous manufacture of activated carbon as set forth in claim 1, wherein said activating agent is zinc chloride.

3. The method for the continuous manufacture of activated carbon as set forth in claim 1, wherein said carbonized material charged in the carbonizing zone is heated at 200° to 300°C.

4. The method for the continuous manufacture of activated carbon as set forth in claim 1, wherein said activating agent-impregnated cellulosic material is allowed to reside in the carbonizing zone for 30 to 120 minutes.

5. The method for the continuous manufacture of activated carbon as set forth in claim 1, wherein said activating agent-impregnated cellulosic material is supplied in dry weight to the carbonizing zone at a supply rate per minute of (1/15) to (1/60) the weight of the carbonized material in the carbonizing zone.

6. The method for the continuous manufacture of activated carbon as set forth in claim 5, wherein said supply rate per minute is in the range of (1/20) to (1/40) the weight of the carbonized material in the carbonizing zone.

* * * * *